(12) United States Patent
Nezaki et al.

(10) Patent No.: US 7,740,271 B2
(45) Date of Patent: Jun. 22, 2010

(54) AIR BELT APPARATUS FOR MOTOR VEHICLE

(75) Inventors: Takuya Nezaki, Mizunami (JP); Yoji Suyama, Tokyo (JP)

(73) Assignees: Toyota Jidosha Kabushiki Kaisha, Toyota-shi (JP); Takata Corporation, Tokyo (JP)

( * ) Notice: Subject to any disclaimer, the term of this patent is extended or adjusted under 35 U.S.C. 154(b) by 181 days.

(21) Appl. No.: 11/703,149

(22) Filed: Feb. 7, 2007

(65) Prior Publication Data

US 2007/0182136 A1 Aug. 9, 2007

(30) Foreign Application Priority Data

Feb. 9, 2006 (JP) .............................. 2006-032053

(51) Int. Cl.
*B60R 21/18* (2006.01)
(52) U.S. Cl. .................. 280/733; 280/808; 297/483
(58) Field of Classification Search ................ 280/733, 280/808; 297/483; *B60R 21/18*
See application file for complete search history.

(56) References Cited

U.S. PATENT DOCUMENTS

| | | | | |
|---|---|---|---|---|
| 3,510,151 A | * | 5/1970 | Weman | 280/808 |
| 3,844,001 A | * | 10/1974 | Holmberg | 24/598.1 |
| 4,348,037 A | * | 9/1982 | Law et al. | 280/733 |
| 5,201,099 A | * | 4/1993 | Campbell | 24/198 |
| 5,303,953 A | * | 4/1994 | Kamiyama et al. | 280/733 |
| 5,393,091 A | | 2/1995 | Tanaka et al. | |
| 5,829,841 A | * | 11/1998 | Pywell et al. | 297/471 |
| 5,839,753 A | * | 11/1998 | Yaniv et al. | 280/733 |
| 5,851,055 A | * | 12/1998 | Lewis | 297/483 |
| 7,004,547 B1 | * | 2/2006 | Cheng | 297/483 |
| 7,566,072 B2 | * | 7/2009 | Kokeguchi et al. | 280/733 |
| 2006/0170199 A1 | * | 8/2006 | Sundararajan et al. | 280/733 |
| 2007/0069508 A1 | * | 3/2007 | Kokeguchi et al. | 280/733 |
| 2007/0069510 A1 | * | 3/2007 | Suyama et al. | 280/733 |

FOREIGN PATENT DOCUMENTS

| | | |
|---|---|---|
| DE | 199 50 951 A1 | 4/2001 |
| DE | 19950951 A1 * | 4/2001 |
| EP | 1 767 412 A2 | 3/2007 |
| JP | 11-180241 | 7/1999 |
| JP | 2001-239906 | 9/2001 |
| WO | WO 00/21798 | 4/2000 |

* cited by examiner

*Primary Examiner*—Paul N Dickson
*Assistant Examiner*—Laura Freedman
(74) *Attorney, Agent, or Firm*—Foley & Lardner LLP

(57) ABSTRACT

An airbelt apparatus including a belt guide that is capable of moving so that an expansion portion of the airbelt may expand upward alongside an occupant's head. The belt guide also limits an expanding shape of the expansion portion.

11 Claims, 6 Drawing Sheets

AIR BELT APPARATUS FOR MOTOR VEHICLE

BACKGROUND

The present application relates to an air belt apparatus for a motor vehicle, provided with an expansion portion corresponding to a head portion of an occupant when the air belt apparatus is inflated.

An air belt apparatus provided with a height position control device, in which a shoulder anchor for guiding a webbing for occupant restraint, provided with an expansion portion, is set to a height position where the same does not face to a side face of a head portion of the occupant at a normal time, and which the shoulder anchor is set to a position where the same faces a side of the head portion of the occupant at a side face collision, is disclosed in Japanese Unexamined Patent Application Publication No. 2001-239906 (incorporated by reference herein). On the other hand, an air belt apparatus, in which a belt guide for guiding a webbing for occupant restraint is fixed to a shoulder portion of a seatback, is disclosed in Japanese Unexamined Patent Application Publication No. 2002-527282 (incorporated by reference herein).

However, when the expansion portion in an air belt is inflated, since internal pressure is uniformly affected in the expansion portion, a cross-sectional shape of the expansion portion ordinarily tends to become a round shape. Accordingly, as in the hitherto known example described in the aforementioned patent publication, when the expansion portion is intended to be laterally enlarged at a side of the head portion of the occupant in an upper and lower direction of the motor vehicle, an expansion diameter of the expansion portion is entirely large sized, and thereby a folded-back thickness of the expansion portion in an ordinary use is increased. Consequently, it has been hard for usability of the webbing for occupant restraint to be preferably maintained.

Further, as in the hitherto known example described in the aforementioned patent publication, when the belt guide having a horizontally long guide hole is fixed to the seatback, the expansion portion is widely expanded in a vehicle-width direction by means of being limited by the guide hole, and therefore it has been hard for the expansion portion to be expanded toward an upper position facing the head portion of an occupant in the vehicle-width direction.

SUMMARY

The disclosed embodiments strive to improve a capability for an occupant by employing of absorbing inertia force in a vehicle-width direction of the head portion, using the expansion portion, while far largely expanding the expansion portion in the upper and lower direction of the motor vehicle, at a position facing in a width direction of the head portion of the occupant when in side collision, securing the usability of the webbing for occupant restraint in the ordinary use.

According to a disclosed embodiment an air belt apparatus for a motor vehicle is provided. The apparatus includes a webbing for occupant restraint corresponding to a chest portion of an occupant and an expansion portion provided in the webbing for occupant restraint, corresponding to a head portion of the occupant seated in a vehicle seat when in expansion. The apparatus also includes an inflator capable of supplying gas for use in inflating, into the expansion portion and a side collision sensor detecting or predicting a side collision. The apparatus also includes a control device for activating the inflator on the basis of an output signal from the side collision sensor. A belt guide is provided on a shoulder portion of a seatback in the vehicle seat, and capable of being developed in a direction to be spaced apart from the head portion up to a predetermined angle limited by a stopper mechanism about a fulcrum positioned at an outside in a vehicle-width direction from an ordinary condition in which the webbing for occupant restraint is guided, at a time when the expansion portion is expanded, the belt guide causing the expansion portion to be expanded toward an upper position facing the head portion in the vehicle-width direction while limiting an expanding shape of the expansion portion.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
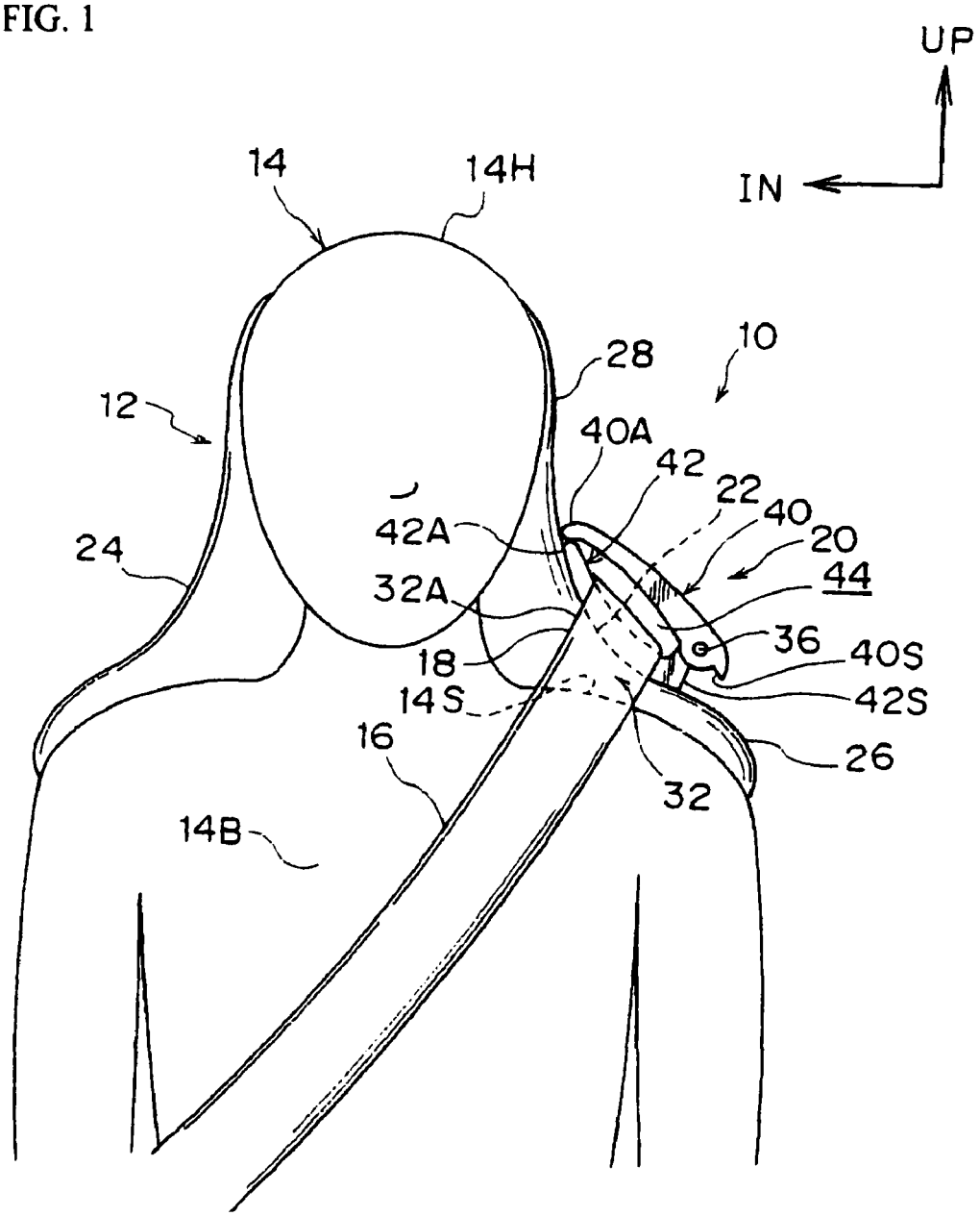
FIG. 1 is an elevation showing a condition, in which an occupant is seated in a vehicle seat where an air belt apparatus for a motor vehicle is applied, and which the occupant wears webbing for occupant restraint guided by a belt guide in an ordinary condition.

According to a disclosed embodiment, an airbelt apparatus including a webbing for occupant restraint corresponding to a chest portion of an occupant is provided. The apparatus includes an expansion portion provided in the webbing for occupant restraint, corresponding to a head portion of the occupant seated in a vehicle seat when in expansion. The apparatus also includes an inflator capable of supplying gas for use in inflation, into the expansion portion, a side collision sensor detecting or predicting a side collision, a control device for activating the inflator on the basis of an output signal from the side collision sensor. A belt guide is also provided on a shoulder portion of a seatback in the vehicle seat, capable of being developed in a direction to be spaced apart from the head portion up to a predetermined angle limited by means of a stopper mechanism, about a fulcrum positioned at an outside in a vehicle-width direction from an ordinary condition in which the webbing for occupant restraint is guided, at a time when the expansion portion is expanded, and causing the expansion portion to be expanded toward an upper position facing the head portion in the vehicle-width direction while limiting an expanding shape of the expansion portion.

The aforementioned embodiment operates so that when the side collision to an occupant side is detected or predicted, the inflator is activated and a large amount of gas is blown out from the inflator, the expansion portion is inflated by means of the gas. At this moment, the belt guide is started to be developed in a direction to be spaced apart from the head portion of the occupant about a fulcrum by means of inflation pressure of the expansion portion. When the belt guide is developed up to the predetermined angle, further development of the belt guide is limited by means of a stopper mechanism. Thereby, the movement and the expansion of the expansion portion toward an outside in the vehicle width direction can be limited, and the expansion portion can be expanded toward an upper position facing the head portion of the occupant in the vehicle-width direction. By limiting the expansion of the expansion portion toward the outside in the vehicle width direction, a capacity of the expansion portion can be suppressed and thereby a folded-back thickness of the expansion portion in an ordinary use can be suppressed.

Accordingly, in some embodiments, a capability for restraining the occupant can further be improved by absorbing inertia force of a head portion in the vehicle-width direction, by means of an expansion portion, by far largely expanding the expansion portion in an upper and lower direction of the motor vehicle at a position facing the head portion of an occupant in the vehicle-width direction in a side collision, while securing usability of webbing for occupant restraint in an ordinary use.

The aforementioned belt guide may include a pair of guide members connected to be capable of being opened and closed at the fulcrum, and the stopper mechanism is formed of stopper portions provided in the aforementioned pair of guide members being in contact with each other when the aforementioned pair of guide members is developed up to the aforementioned predetermined angle.

The developing angle of the pair of guide members at a time of expansion of the expansion portion may be limited by the stopper portion provided in the pair of guide members. By providing the stopper portion in the pair of guide members, the belt guide being developed up to the predetermined angle can be manufactured at low costs.

A cover for covering the aforementioned expansion portion in a condition being folded back, in which an end edge at the aforementioned head portion side is stitched with a tear seam to be ruptured by inflation pressure of the expansion portion is provided.

In the air belt apparatus according to claim 3, the tear seam stitching the end edge at the head portion side in the cover is ruptured by the inflation pressure when the expansion portion is expanded, and the expansion portion is expanded out from the end edge. Accordingly, not only an expanding shape of the expansion portion is limited by means of the belt guide, but also the expansion portion is far largely expanded in an upper and lower direction of the motor vehicle at a position facing the head portion of the occupant in the vehicle-width direction with ease. Thereby, absorbability for absorbing the inertia force of the head portion in the vehicle-width direction can be increased, and therefor the capability for restraining the occupant can further be improved.

As explained above, an advantage can be obtained, in which a capability for restraining an occupant can further be improved by absorbing inertia force of a head portion in a vehicle-width direction by means of an expansion portion, by far largely expanding the expansion portion in an upper and lower direction of motor vehicle at a position facing the head portion of the occupant in the vehicle-width direction in a side collision, while securing usability of webbing for occupant restraint in an ordinary use.

Another advantage can be obtained, in which a belt guide developing up to a predetermined angle can be manufactured at low costs by providing a stopper portion in a pair of guide members.

A further advantage is obtained, in which the capability for restraining the occupant can further be improved by means of that the expansion portion is far largely expanded with ease in the upper and lower direction of the motor vehicle at the position facing the head portion of the occupant in the vehicle-width direction, and thereby the absorbability for the inertia force of the head portion in the vehicle-width direction can further be increased.

Disclosed embodiments will now be described with reference to the drawings. In FIG. 1, an air belt apparatus 10 for a motor vehicle according to the present embodiment is a kind of seat belt for restraining an occupant 14 seated in a vehicle seat 12. The air belt apparatus 10 for a motor vehicle is provided with webbing 16 for occupant restraint, an expansion portion 18, an inflator (not shown) capable of supplying gas for inflating into the expansion portion 18, a side collision sensor (not shown) for detecting or predicting a side collision, control device (not shown) for activating the inflator on the basis of an output signal from the side collision sensor, and a belt guide 20.

The vehicle seat 12 is a bucket-type seat in which, for example, a headrest portion 28 is integrally provided on a seatback 26, and in the head rest portion 28 and the seatback 26, a slanting portions, 22 and 24, spreading, for example, in a mountain-contour like manner looking from a front side of the motor vehicle, is integrally formed. In addition, the belt guide 20 is provided, for example, at the slanting portion 22 at an outside in the vehicle-width direction.

At a side portion of an outside of a vehicle interior of a seat cushion, which is not shown, a lap belt anchor is provided, and at a side portion of a center side of the vehicle interior of the seat cushion, a buckle apparatus is respectively provided (not shown). Incidentally, positions where the lap belt anchor and the buckle apparatus are provided are not limited to the seat cushion, and, for example, a floor panel side may be applicable. In the buckle apparatus or outside the buckle apparatus, the inflator as a gas-supplying source for the expansion portion 18 is disposed (not shown). In a case that an ECU (not shown) as an example of the control device detects or predicts the side collision by means of an output signal from the side collision sensor, the inflator is configured to be activated.

Incidentally, in a case that the expansion portion 18 is to be corresponded to a chest portion 14B of the occupant 14, the inflator is configured to be also activated in a case that a front collision is detected or predicted. In this case, the inflator for the front collision and that for the side collision may be separately used, or one inflator having variable output may be configured to correspond thereto.

The webbing 16 for occupant restraint is a belt shaped member that corresponds to the chest portion 14B of the occupant 14 and is constructed to be capable of being retracted in a retractor (not shown) provided in the vehicle body. When the webbing 16 for occupant restraint is worn by the occupant 14, the same can be pulled out from the retractor conforming to a physical size of the occupant 14, and the webbing 16 for occupant restraint at this moment is configured to be guided by means of the belt guide 20 in an ordinary condition shown in FIG. 1. Further, the webbing 16 for occupant restraint pulled out from the retractor is configured to be pulled around toward a front side of the seatback 26, while being guided by means of the belt guide 20 provided at the side portion of the outside in the vehicle-width direction of the head rest portion 28.

In the webbing 16 for occupant restraint, a tongue plate (not shown) constructed capable of being fitted into the buckle apparatus is provided and the webbing 16 for occupant restraint is configured capable of supplying the gas from the inflator to the expansion portion 18 from the buckle apparatus side, when the tongue plate is fitted into the buckle apparatus. Incidentally, a supplying path way of the gas from the inflator is not limited thereto.

Figure 2:
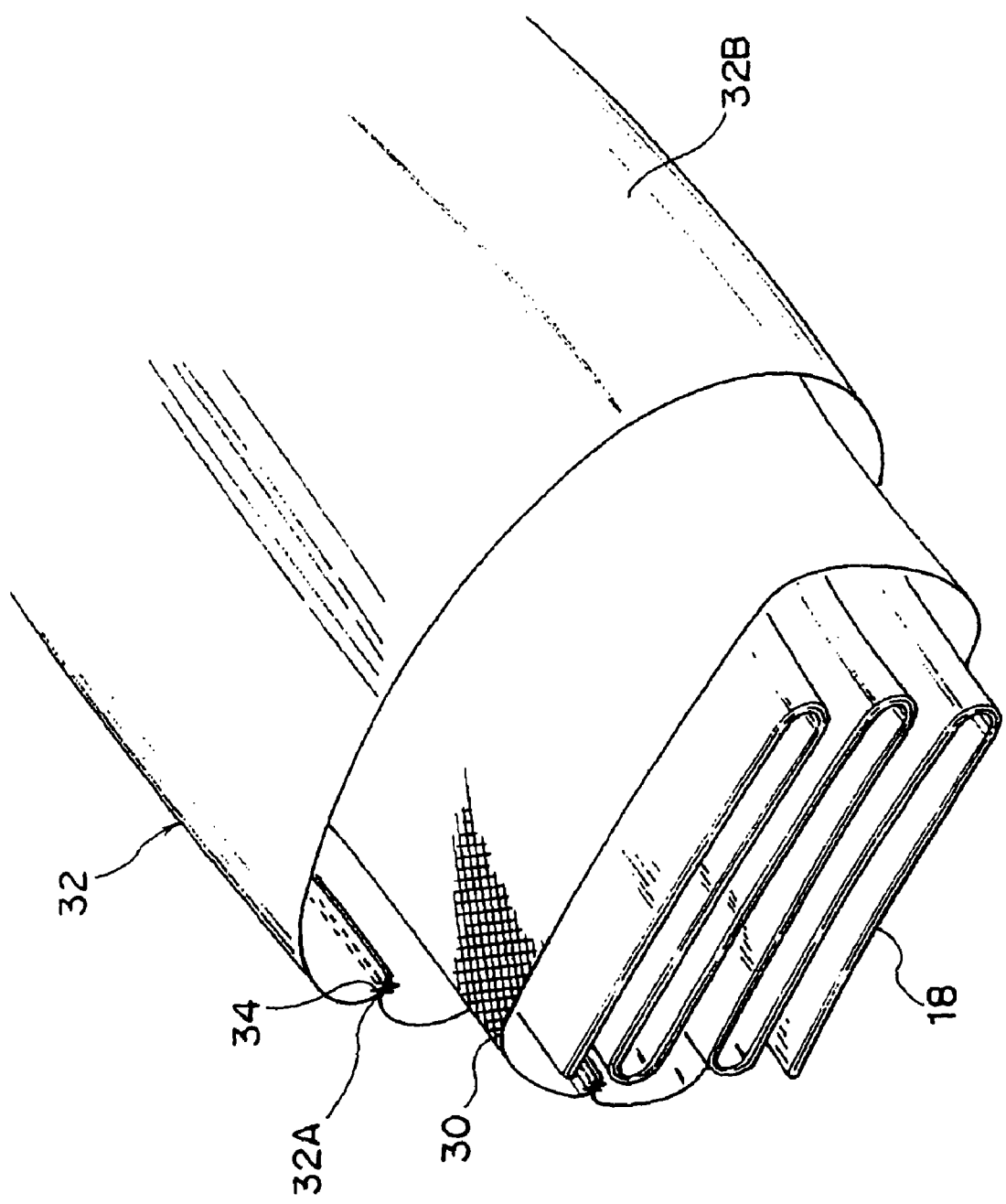
FIG. 2 is an enlarged perspective view showing a condition, in which an expansion portion covered with mesh webbing is further covered with a cover, and which an end edge of a head portion side of an occupant in the cover is stitched with a tear seam.

As shown in FIG. 2, the expansion portion 18 is provided in the webbing 16 for occupant restraint, and is a bag-shaped member being folded back so as to correspond the head portion 14H of the occupant 14 seated in the vehicle seat 12 when in expansion. The expansion portion 18 is covered with, for example, mesh webbing 30 and a cover 32 in the order from inside thereof. The mesh webbing 30 is formed of, for example, a mesh like bag-shaped member or a cylindrically shaped member, which is expandable along an expansion of the expansion portion 18. The cover 32 is constructed to be non-extendable, different from the mesh webbing 30, and an end edge 32A at the head portion 14H (in FIG. 1) side is stitched with a tear seam 34 that is ruptured by inflation pressure of the expansion portion 18. In concrete terms, the cover 32 is formed by means of that a non-extendable sheet member is folded back into two at a portion to be an end edge 32B of an outside in the vehicle-width direction as a center first, and then the cover 32 covers the expansion portion 18 in a folded-back condition of being covered by means of the mesh webbing 30, and stitched along the end edge 32A with the tear seam 34.

Figure 3:
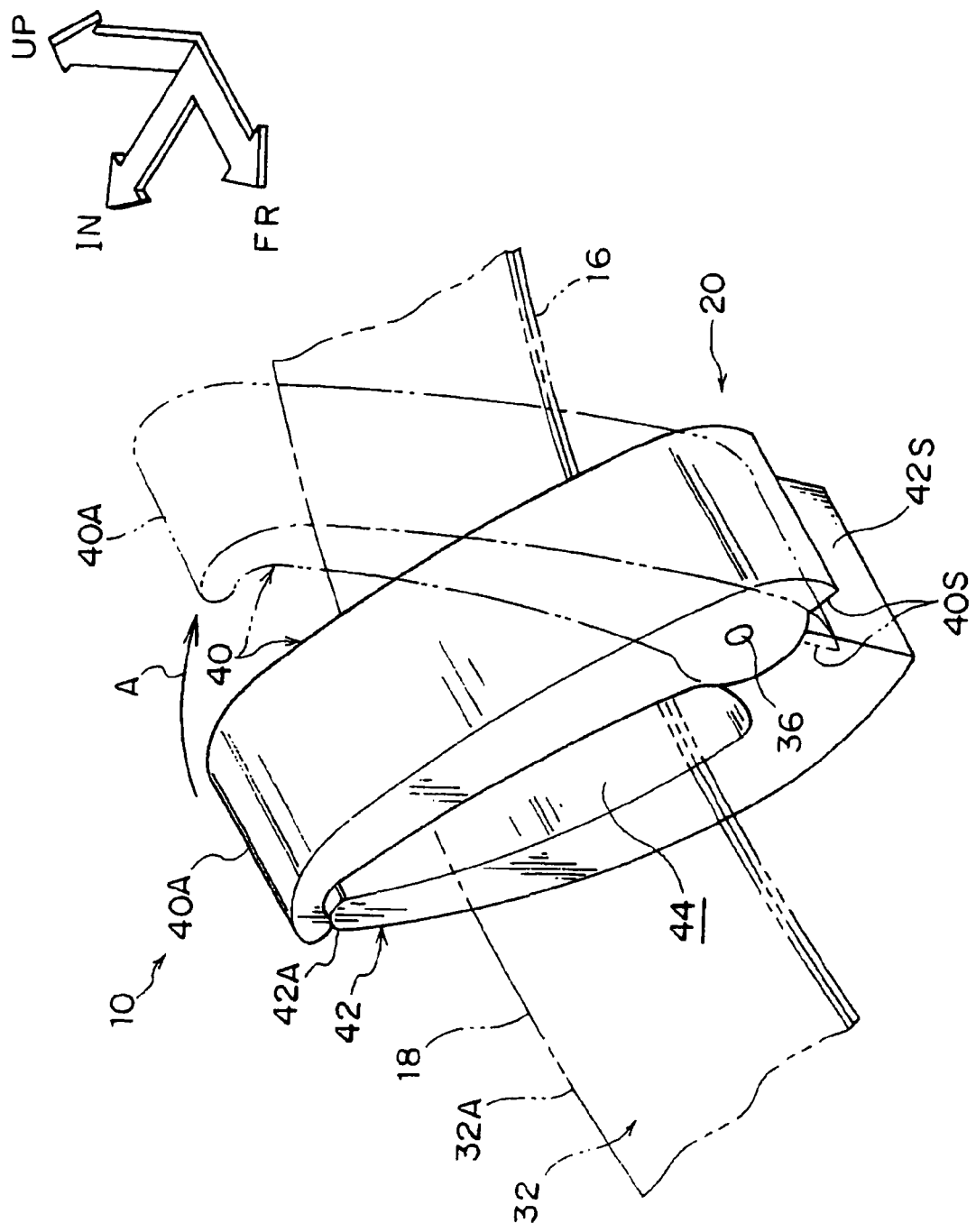
FIG. 3 is an enlarged perspective view showing a belt guide in an ordinary condition and a developed condition.

Incidentally, although the expansion portion 18 shown in FIG. 2 is illustrated in a condition that the mesh webbing 30 and the cover 32 are expanded to some extent, the expansion portion 18 in the ordinary condition is, as shown in FIG. 3, formed into a belt-like shape similar to the webbing 16 for occupant restraint. The cover 32 is not limited to the one that is folded back into two, and the same may be formed by means of that, for example, the expansion portion 18 in the folded-back condition being covered with the mesh webbing 30 is sandwiched by means of two sheet members (not shown), and the end edge 32A of which is stitched with the tear seam 34, and the other end edge 32B is stitched with a string (not shown) that does not rupture the end edge 32B when in expansion of the expansion portion 18.

Figure 6:
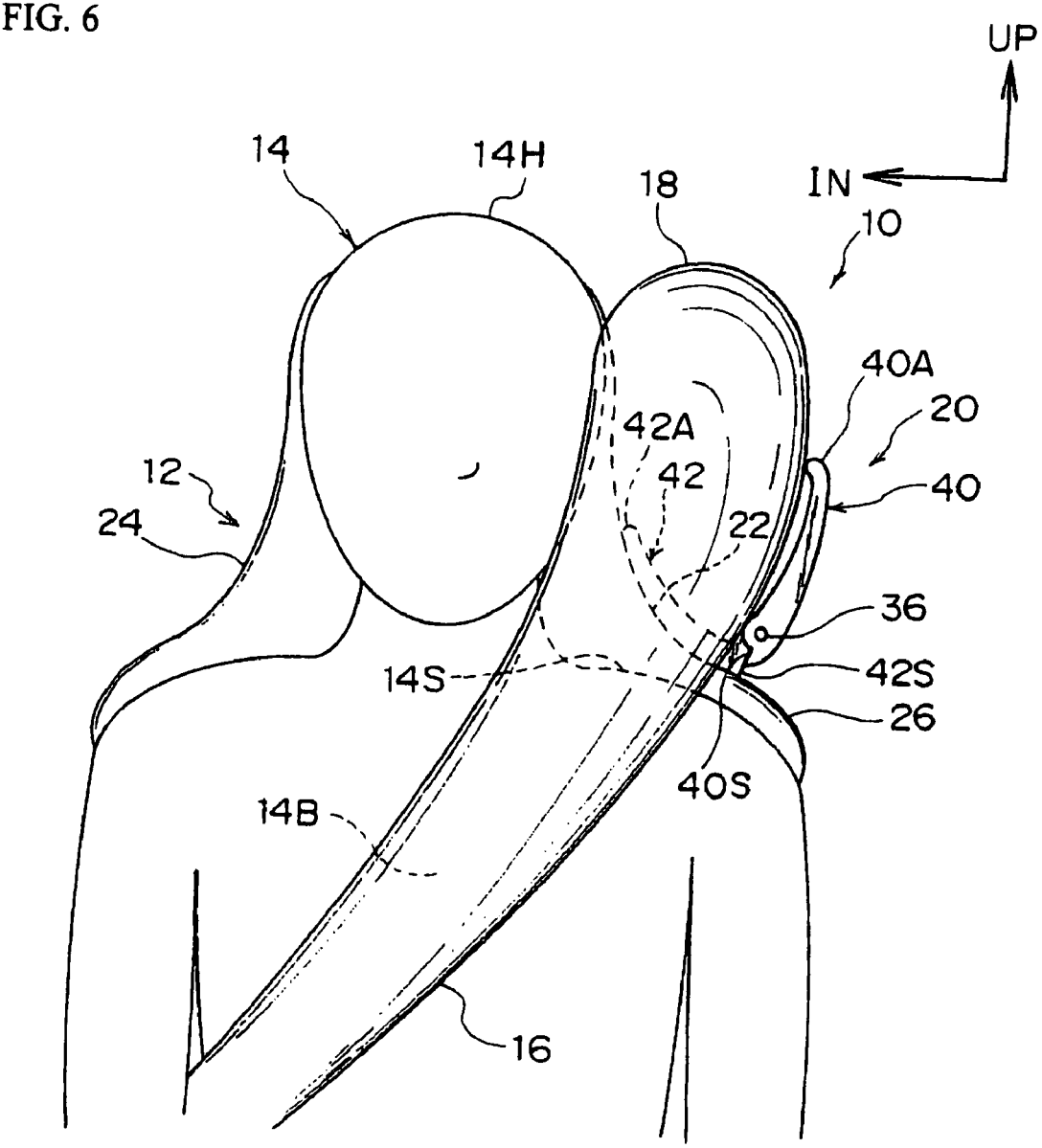
FIG. 6 is an elevation showing a condition in which the expansion portion is largely expanded toward an upper position facing the head portion of the occupant in a vehicle-width direction and in an upper and lower direction of the motor vehicle, by limiting movement and expansion of the expansion portion toward an outside in the vehicle-width direction by of the belt guide.

As shown in FIG. 1, the belt guide 20 is provided at the slanting portion 22 as an example of a shoulder portion of the seatback 26 in the vehicle seat 12. The belt guide 20 can be developed in a direction (a direction indicated by an arrow A in FIG. 3) departing from the head portion 14H up to a predetermined angle that is limited by stopper portions, 40S and 42S, as an example of a stopper mechanism around a pivot point or fulcrum 36 positioned at an outside in the vehicle-width direction, as a center, from the ordinary condition in which the webbing 15 for occupant restraint is guided when in expansion of the expansion portion 18. As shown in FIG. 6, the belt guide 20 is that for expanding the expansion portion 18 toward an upper position facing the head portion 14H in a vehicle-width direction, while limiting an expanded shape of the expansion portion 18. More in concrete terms, as shown in FIG. 3, the belt guide 20 comprises a pair of guide members, 40 and 42, connected capable of being free to open and close to each other at the fulcrum 36 by means of, for example, a pin connection. In the guide members, 40 and 42, stopper portions, 40S and 42S contacting each other when the pair of top and bottom guide members, 40 and 42, are developed up to the predetermined angle are respectively provided as the stopper mechanism.

The bottom guide member 42 disposed below the guide member 40 is fixed in a manner so as to be located alongside of the slanting portion 22 of the seatback 26 for example, and only the guide member 40 at the upside is rotatable around the fulcrum 36 as a center. In the ordinary condition, the guide member 40 at the upside is closed in a manner so as to be overlapped on the guide member 42, and between the guide member 40 and the guide member 42, a gap 44 allowing the webbing 16 for occupant restraint to pass through is formed. In addition, in the ordinary condition, an end portion 40A at the head portion 14H side of the guide member 40 is located in the vicinity of the end portion 42A at the head portion 14H side of the guide member 42, or is in contact with the same, or is engaged with the end portion 42A.

Figure 4:
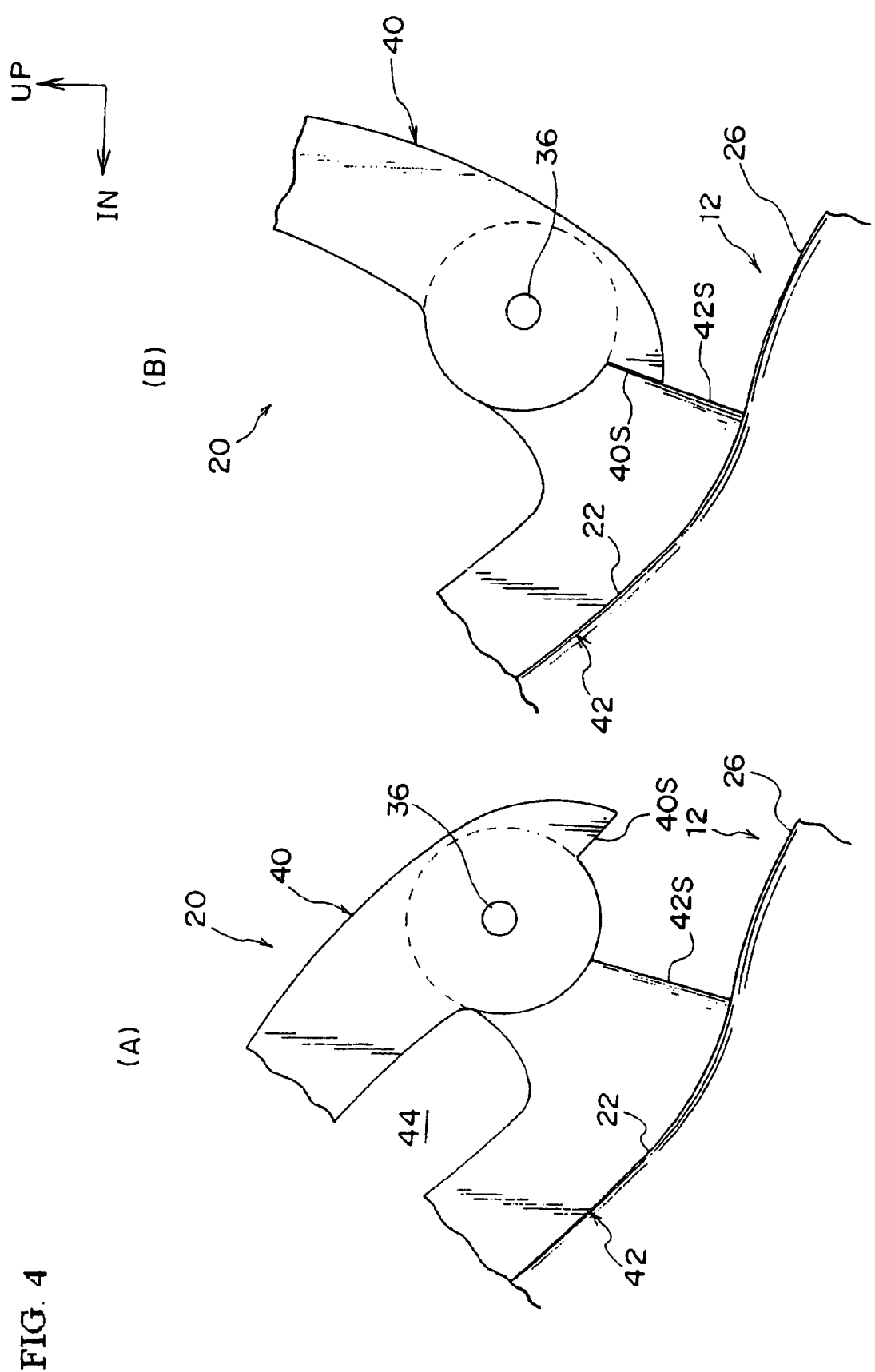
FIG. 4(A) is a partially enlarged elevation showing a stopper portion of the belt guide in the ordinary condition when a pair of guide members is closed.
FIG. 4(B) is a partially enlarged elevation showing a condition in which an upside guide member is developed up to a position where each of the stopper portions is in contact therewith.

As shown in FIG. 1, FIG. 3, and FIG. 4(A), the stopper portion 40S is a surface being approximately in parallel with a longitudinal direction of the guide member 40, which is provided, for example, at a portion integrally protruding at an end portion of the fulcrum 36 side of the guide member 40. On the other hand, a stopper portion 42S is an end surface at the fulcrum 36 side of the guide member 42, for example. The stopper portions 40S, 42S, and the fulcrum 36 have strength bearable for the inflation pressure of the expansion portion 18. As shown in FIG. 4(B), the guide member 40 is configured to be limited not to be developed by a predetermined angle or more when in expansion of the expansion portion 18 by means of that the stopper portion 40S contacts the stopper portion 42S. Incidentally, so as to expand the expansion portion 18 toward the upper position facing the head portion 14H in the vehicle-width direction, while limiting the expanding operation of the expansion portion 18 toward outside in the vehicle-width direction, it is preferable to limit a developing angle of the guide member 40 to an extent that the guide member 40 forms approximately right angle with the slanting portion 22, which is an upper limit. In order to further limit the expanding operation toward outside in the vehicle-width direction of the expansion portion 18, it is preferable to limit the developing angle to an extent that the guide member 40 becomes to be approximately in parallel with the upper and lower direction of the motor vehicle, as an upper limit.

[Operation]

In FIG. 1, in the air belt apparatus 10 for the motor vehicle, the webbing 16 for occupant restraint pulled out from the retractor is guided by the belt guide 20 in the ordinary condition, namely in the condition in which the guide member 40 is closed, and the webbing 16 for occupant restraint can appropriately be pulled around the chest portion 14B of the occupant 14, and therefore usability thereof is good. Although the occupant 14 is brought to be in a condition of being restrained by the webbing 16 for occupant restraint when the occupant 14 wears the webbing 16 for occupant restraint, a wearing sensation of the webbing 16 for occupant restraint is good. This is because the belt guide 20 is provided on the slanting portion 22 of the seatback 26, and therefore the webbing 16 for occupant restraint is located at a relatively high position close to a shoulder portion 14S of the occupant 14.

Figure 5:
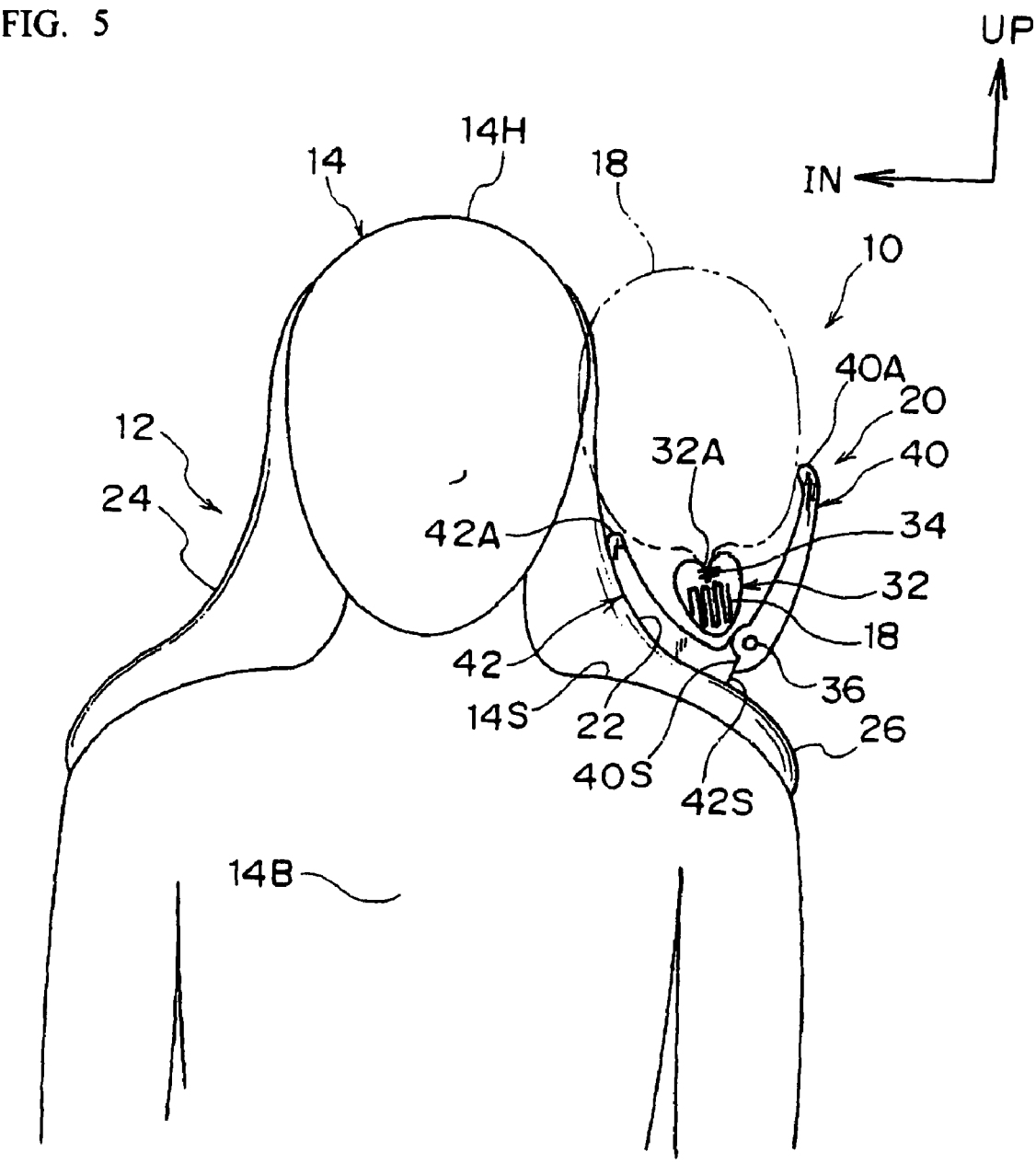
FIG. 5 is an elevation showing a condition in which a tear seam of the cover is ruptured and the expansion portion is expanded toward the head portion side of the occupant.

In this condition, when the side collision toward a seating side of the occupant 14 is detected or predicted by means of the side collision sensor, the inflator is activated, a large amount of gas is blown out from the inflator, and the expansion portion 18 is expanded by means of the gas. At this moment, as shown in FIG. 5, by means of the inflation pressure at a time of the expansion of the expansion portion 18, the tear seam 34 that has been stitching the end edge 32A at the head portion 14H side in the cover 32 is ruptured, and the expansion portion 18 is being expanded out from the end edge 32A. At this moment, as also shown in FIG. 3, the guide member 40 of the belt guide 20 is started to be developed in a direction to be spaced apart from the head portion 14H of the occupant 14 (in a direction indicated by an arrow A) around the fulcrum 36, as a center by means of the inflation pressure of the expansion portion 18. When the guide member 40 is developed up to the predetermined angle, the stopper portion 40S is brought to be in contact with the stopper portion 42S, and the further developing operation of the guide member 40 is limited. Thereby, movement and expansion of the expansion portion 18 toward outside the vehicle-width direction can be limited by means of the guide member 40.

As described above, in the air belt apparatus 10 for the motor vehicle, the movement and the expansion of the expansion portion 18 toward outside in the vehicle-width direction is limited at the time of the side collision, while securing the usability of the webbing 16 for occupant restraint in the ordinary use. Thereby, the expansion portion 18 can be expanded toward the upper position facing the head portion 14H of the occupant 14 in the vehicle-width direction. In addition, as shown in FIG. 5, since the end edge 32A at the head portion 14H side of the cover 32 is stitched with the tear seam 34, the expansion portion 18 is easily expanded to the occupant 14 side, and the same is far largely expanded with ease in the upper and lower direction of the motor vehicle, at a position facing the head portion 14H of the occupant 14 in the vehicle-width direction. Absorbability for absorbing the inertia force of the head portion 14H in the vehicle-width direction can be increased by thus expanding the expansion portion 18 and therefor the capability for restraining the occupant can further be improved. Further, by limiting the expanding operation toward the outside in the vehicle-width direction of the expansion portion 18, a capacity of the expansion portion 18 can be suppressed, and thereby a folded-back thickness of the expansion portion 18 in the ordinary use can thereby be suppressed.

Incidentally, in the belt guide 20, since the stopper portions, 40S and 42S, are provided on the pair of guide members, 40 and 42, respectively, the belt guide 20, which is developed up to the predetermined angle, can be manufactured at low costs. Further, since the belt guide 20 is provided on the seatback 26, the air belt apparatus 10 for the motor vehicle can be applied to, for example, a convertible having no vehicle body portion corresponding to a center pillar.

Further, the construction of the belt guide 20 in not limited to the above-described and illustrated example, and when the expanding shape of the expansion portion 18 is limited and thereby the expansion portion 18 can be expanded to the upper position facing the head portion 14H in the vehicle-width direction, other construction may be applied. For example, although the illustrated fulcrum 36 is a portion at which the guide members, 40 and 42, are combined with a pin, for example, the guide members, 40 and 42, may be integrally formed with a portion of the fulcrum 36 as a hinge. Furthermore, it may be configured that a twisting coil spring (not shown) is provided at the fulcrum 36, and the guide member 40 is biased by means of the twisting coil spring so that the guide member 40 is closed in the ordinary condition. Moreover, although as a stopper mechanism, the stopper portions, 40S and 42S, are listed, the stopper mechanism is not limited to the above-described, and a stopper portion for limiting the developing angle of the guide member 40 may be provided, for example, at the seatback 26 side.

Further, in the aforementioned embodiment, although a structure, in which the expansion portion 18 is attached to the webbing 16 for occupant restraint, is explained, the structure may be formed such that a middle portion of, or a part of the webbing 16 for occupant restraint is constructed with the expansion portion 18, and that the expansion portion 18 is provided with a role as the webbing 16 for occupant restraint.

What is claimed is:

1. An occupant protection system for a motor vehicle, comprising:
   a webbing for occupant restraint corresponding to a chest portion of an occupant;
   an expansion portion provided in the webbing for occupant restraint, corresponding to a head portion of the occupant seated in a vehicle seat when in expansion;
   an inflator capable of supplying inflation gas into the expansion portion;
   a side collision sensor for detecting or predicting a side collision;
   a control device for activating the inflator on the basis of an output signal from the side collision sensor; and
   a belt guide provided on an inclined portion of a shoulder portion of a seatback in the vehicle seat, and capable of being developed in a direction to be spaced apart from the head portion up to a predetermined angle limited by a stopper mechanism about a fulcrum positioned at an outside in a vehicle-width direction from an ordinary condition in which the webbing for occupant restraint is guided, at a time when the expansion portion is expanded, the belt guide causing the expansion portion to be expanded toward an upper position facing the head portion in the vehicle-width direction while limiting an expanding shape of the expansion portion, and wherein the expansion portion is expanded upward above and out of the belt guide in a vehicle-height direction, and
   a cover for covering the expansion portion in a condition being folded back, wherein an upper end side of the cover facing away from the shoulder portion of the seatback at the head portion side is stitched with a tear seam to be ruptured by inflation pressure of the expansion portion.

2. The system of claim 1, wherein the belt guide comprises a pair of guide members connected to be capable of opening and closing at the fulcrum, and wherein the stopper mechanism is formed of stopper portions provided in the pair of guide members being in contact with each other when the pair of guide members is developed up to the predetermined angle.

3. The system of claim 1, wherein the belt guide comprises a pair of guide members connected to be capable of opening and closing at the fulcrum, and
   when the guide members open, the guide members separate from each other at an end of the belt guide opposite the fulcrum.

4. An air belt apparatus for a motor vehicle, comprising:
   a webbing including a portion for restraining the chest of an occupant seated in a vehicle seat;
   an expansion portion provided in the webbing for restraining the head of the occupant;
   a belt guide provided on an inclined portion of a shoulder portion of a back of the vehicle seat; and
   a cover for covering the expansion portion in a folded condition, an upper end side of the head portion side of the cover facing away from the shoulder portion of the back of the vehicle seat is stitched with a tear seam to be ruptured by inflation pressure of the expansion portion, and wherein the belt guide includes a pivot point that permits the belt guide to separate thereby allowing the expansion portion to expand out from the belt guide into a position alongside the head of the occupant, and wherein the expansion portion is expanded out of the belt guide in a vehicle-height direction.

5. The apparatus of claim 4, wherein the belt guide includes a top and bottom guide members, and wherein the top guide member pivots away from the bottom guide member to allow the expansion portion to expand out of the belt guide.

6. The apparatus of claim 5, wherein the pivoting motion of the top guide member is limited so that the top guide member limits an expanding shape of the expansion portion.

7. The apparatus of claim 6, wherein the guide members include stopper portions configured to contact each other to limit pivoting of the top guide member to a predetermined angle.

8. The apparatus of claim 5, wherein when the top guide member pivots, the top and bottom guide members separate from each other at an end of the belt guide opposite a pivot point.

9. The apparatus of claim 4, further comprising an inflator capable of supplying inflation gas into the expansion portion.

10. The apparatus of claim 4, wherein the pivot point is positioned on an outside of the belt guide in a vehicle-width direction.

11. An air belt apparatus for a motor vehicle, comprising:
a webbing including a portion for restraining the chest of an occupant seated in a vehicle seat;
an expansion portion provided in the webbing for restraining the head of the occupant;
a belt guide provided on an inclined portion of a shoulder portion of a back of the vehicle seat; and
a cover for covering the expansion portion in a folded condition, the cover configured to be ruptured by inflation pressure of the expansion portion, and wherein the belt guide includes a pivot point that permits the belt guide to separate thereby allowing the expansion portion to expand out from the belt guide into a position alongside the head of the occupant, and wherein the expansion portion is expanded out of the belt guide in a vehicle-height direction.

* * * * *